(No Model.) 2 Sheets—Sheet 2.

R. E. STEWART.
HATCHWAY OPERATING MECHANISM.

No. 421,448. Patented Feb. 18, 1890.

Witnesses.
F. B. Fethustonhaugh.
H. G. McMillan

Inventor:
Robert E. Stewart
by
Donald C. Ridout & Co
Attys

UNITED STATES PATENT OFFICE.

ROBERT E. STEWART, OF TORONTO, ONTARIO, CANADA, ASSIGNOR OF ONE-HALF TO ROBERT GILRAY, OF SAME PLACE.

HATCHWAY-OPERATING MECHANISM.

SPECIFICATION forming part of Letters Patent No. 421,448, dated February 18, 1890.

Application filed July 8, 1889. Serial No. 316,807. (No model.)

*To all whom it may concern:*

Be it known that I, ROBERT E. STEWART, machinist, of the city of Toronto, in the county of York, in the Province of Ontario, Canada, have invented certain new and Improved Mechanism for Opening and Closing Hatchway-Doors of Elevators and Hoists, of which the following is a specification.

The object of the invention is to design simple mechanism by which the hatchway-door of an elevator or hoist shall be automatically opened by the movement of the elevator-cage; and it consists in the peculiar construction, arrangement, and combination of parts hereinafter more particularly described, and then definitely claimed.

Figure 1:
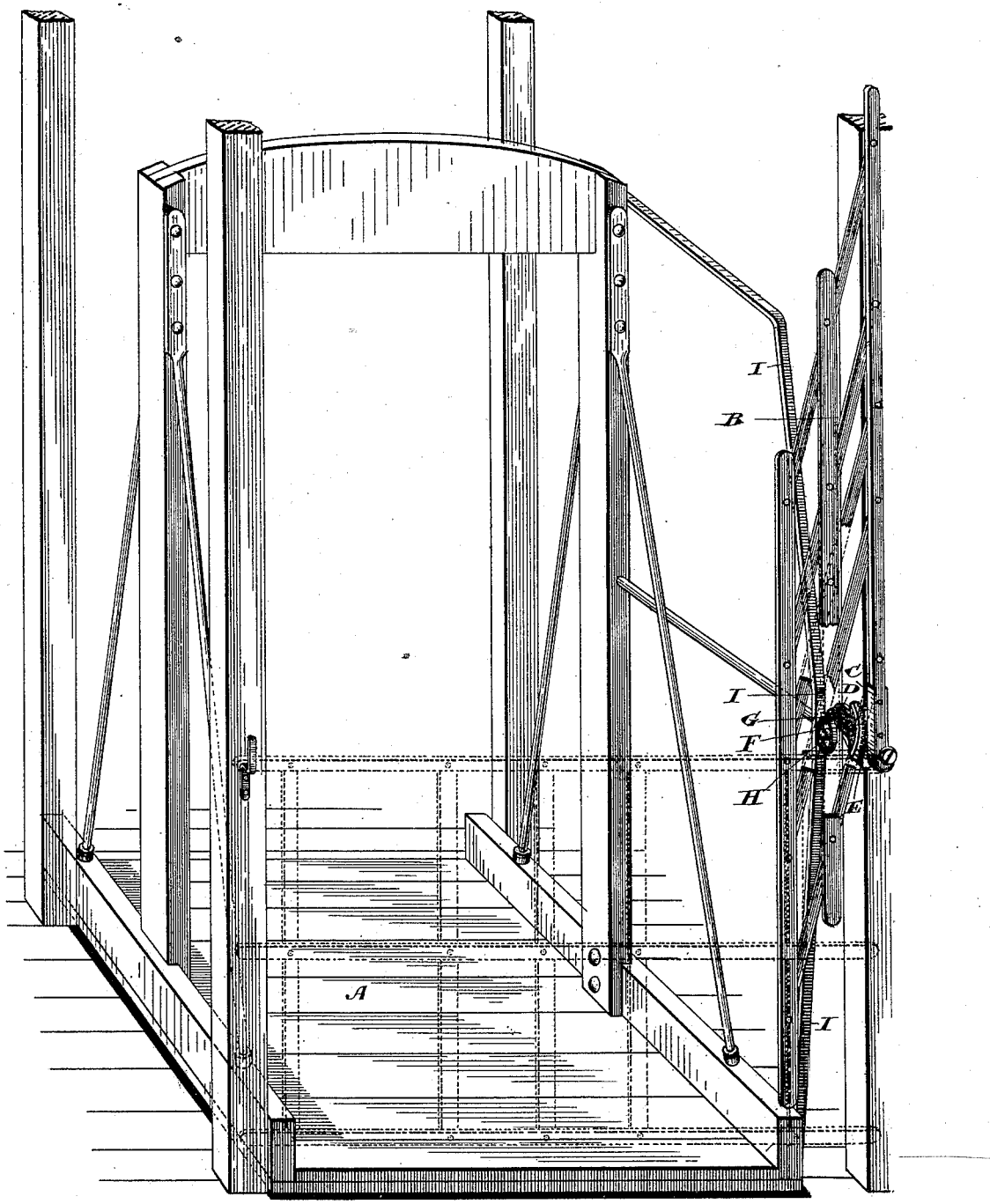
Figure 2:
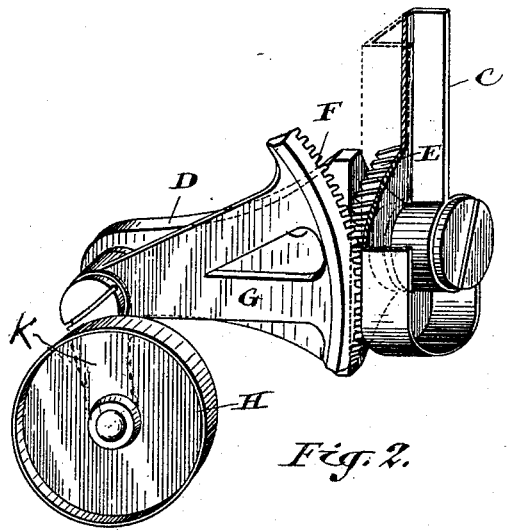
Figure 3:
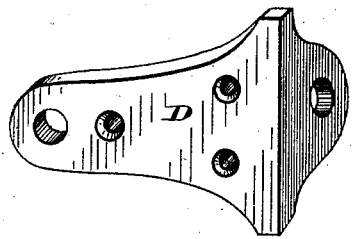

In the accompanying drawings, Figure 1 is a perspective view of an elevator or hoist cage provided with my improvement. Fig. 2 is an enlarged perspective detail of the pivoted arm, pivoted crank, and bracket. Fig. 3 is an enlarged perspective view of the bracket on which the arm and crank are pivoted.

A represents the cage of the hoist, the bottom of the cage being level with the floor at the hatchway, and as a consequence the folded gate B is held open by the mechanism which I shall describe further on. The dotted lines in Fig. 1 represent the gate as it will appear when closed. In the drawings I show the gate composed of three horizontal bars pivotally connected together by vertical bars; but it will of course be understood that I do not wish to confine myself to any particular design of gate. The top bar of the gate B is fixed to the arm C, which is pivoted upon the bracket D. This bracket is fixed to one of the corner-studs of the frame of the hoist. A toothed quadrant E is formed on the arm C, as indicated in Fig. 2, which engages with a toothed quadrant F, formed on one end of the bell-crank G, which is pivoted, as indicated in Fig. 2, on the bracket D. The other arm K (shown in dotted lines) of the crank G has a roller H secured thereon.

I is a bar fixed to the cage A, and shaped substantially as shown in Fig. 1—that is to say, slanting outwardly to a point beyond a vertical line intersecting the periphery of the roller H when in a normal position, in order that when the cage A approaches the hatchway the bar I comes in contact with the roller H and gradually forces it outwardly, so as to cause the crank G to rock on its pivot, and through the quadrants F and E cause the arm C to rock on its pivot, and thus bring the gate B into the position shown in Fig. 1, where it remains so long as the bottom of the cage is flush with the floor at the hatchway. When the cage is moved from this position, either upwardly or downwardly, the weight of the gate A causes it to fall into the position in which it is shown in dotted lines, where it remains until the bar I once more comes in contact with the roller H.

It will be understood that although the roller H is preferable the effect of my invention could be produced without it.

What I claim as my invention is—

1. The combination, with a cage A, of the pivoted gate B, provided with a quadrant E, a bell-crank having on one arm teeth meshing with the quadrant E, and means, as the bar I, constructed and arranged to push on the free arm of the bell-crank as the cage ascends and descends, substantially as described.

2. The combination, with the cage and the frame of the hatchway, of a bracket D, fixed on the hatchway-frame, an arm C, provided with a toothed quadrant F, pivoted on said bracket, a gate B, supported by said arm C, a bell-crank G, having a toothed quadrant F on one end engaging with the quadrant E, and the bar I, fixed on the cage A and operating the bell-crank G, all arranged substantially as and for the purpose specified.

Toronto, June 18, 1889.

ROBERT E. STEWART.

In presence of—
CHARLES C. BALDWIN,
W. G. MCMILLAN.